US008418375B2

(12) United States Patent
Zadnik

(10) Patent No.: US 8,418,375 B2
(45) Date of Patent: Apr. 16, 2013

(54) DOOR HANGING TOOL

(76) Inventor: Dennis P. Zadnik, Newburgh, IN (US)

( * ) Notice: Subject to any disclaimer, the term of this patent is extended or adjusted under 35 U.S.C. 154(b) by 0 days.

(21) Appl. No.: 13/606,587

(22) Filed: Sep. 7, 2012

(65) Prior Publication Data

US 2013/0061464 A1 Mar. 14, 2013

Related U.S. Application Data

(60) Provisional application No. 61/573,558, filed on Sep. 8, 2011.

(51) Int. Cl.

| | |
|---|---|
| ***G01B 3/14*** | (2006.01) |
| ***E04F 21/00*** | (2006.01) |
| ***B43L 7/027*** | (2006.01) |
| ***G01C 9/26*** | (2006.01) |

(52) U.S. Cl.
USPC .................................. 33/371; 33/194; 33/478

(58) Field of Classification Search .................... 33/371, 33/478, 194
See application file for complete search history.

(56) References Cited

U.S. PATENT DOCUMENTS

| | | | | |
|---|---|---|---|---|
| 880,252 | A * | 2/1908 | Tennent | 33/194 |
| 2,679,696 | A * | 6/1954 | Reeder, Jr. | 33/194 |
| 2,949,948 | A * | 8/1960 | Zern | 144/371 |
| 4,141,192 | A * | 2/1979 | Augustine | 52/749.1 |
| 5,353,509 | A * | 10/1994 | Black | 33/451 |
| 5,396,707 | A * | 3/1995 | Blase | 33/194 |
| 5,713,135 | A * | 2/1998 | Acopulos | 33/451 |
| 5,815,937 | A * | 10/1998 | Glorioso, Jr. | 33/370 |
| 6,231,034 | B1 * | 5/2001 | Walker et al. | 269/17 |
| 6,282,852 | B1 * | 9/2001 | Walcker | 52/212 |
| 6,442,853 | B1 * | 9/2002 | Hale et al. | 33/194 |
| 6,966,119 | B1 * | 11/2005 | Dlugoleski | 33/194 |
| 2005/0120572 | A1 * | 6/2005 | Valenti | 33/371 |

* cited by examiner

*Primary Examiner* — Christopher Fulton

(57) ABSTRACT

A door hanging tool includes a horizontal member having at least one bubble vial for the determination of the angle of a surface with respect to the horizontal member and, a vertical member having at least one bubble vial for indicating the inclination of the surface with respect to the vertical member. The horizontal member further defines anchor slots for receiving an anchor means for releasably attaching the tool to the existing pre-drilled hole for lockset from the door manufacturer, such that the user can view the bubble vial of the vertical member for indicating the vertical inclination of the door with respect to the vertical member, and can view the bubble vial of the horizontal member to determine the angle of the door with respect to the horizontal member, and can adjust the door accordingly.

20 Claims, 4 Drawing Sheets

DOOR HANGING TOOL

CROSS REFERENCES TO RELATED APPLICATIONS

U.S. Provisional Application for Pat. No. 61/573,558, filed Sep. 8, 2011, with title "Door Hanging Tool" which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates to a door hanging tool and, in particular, a tool for hanging a pre-hung or existing door to a door jamb both plumb and level.

2. Brief Description of Prior Art

As is known, carpenters are often required to fit and hang doors to door openings in buildings, both commercial and residential. This sometimes requires hanging a door in an existing door jamb when only the door needs replacing and other times requires the installation of a new door jamb and door. In either event, the door is mounted to the door jamb by positioning the door in the door opening and then for example, using small wooden door shims and pry bars to raise and position the door to a position for mounting the door. The door must then be mounted to the jamb again using door shims and pry bars to position the door in the exact position for attaching the door hinges. As should be understood this process is not a one-man job, and in fact often requires the labor of multiple workers to properly position the door and maintain its position during mounting.

As will be seen from the subsequent description, the preferred embodiments of the present invention overcome shortcomings of the prior art. The present invention is directed towards a door hanging tool which allows a single worker to properly position and hang a pre-hung door or an existing door both plumb and level. The tool can further be separated into a storage position when not in use.

SUMMARY OF THE INVENTION

Briefly stated, the present invention is directed to a door hanging tool which allows a single worker to properly position and hang a pre-hung door or an existing door both plumb and level. Once the door hanging tool is installed as will be described, it allows the worker to read both plumb and level hands-free. The door hanging tool of the present invention is generally formed by a horizontal member and an upwardly extending vertical member. The horizontal member includes at least one bubble vial for the determination of the angle of a surface with respect to the horizontal member; and, the vertical member also includes at least one bubble vial for indicating the inclination of a surface with respect to the vertical member. The horizontal member further defines anchor slots for receiving an anchor bolt that extends through the anchor slot and through the existing pre-drilled hole for lockset from the door manufacturer. The anchor bolt includes a first end that is sized larger than the anchor slot so that the anchor bolt cannot pass completely through the anchor slot, and has a second, threaded end that in application is secured in threaded engagement with an anchor nut such that the tool can be anchored to a door by first inserting the anchor bolt through the anchor slot in the horizontal member and the pre-drilled hole in the door and loosely attaching with the bolt. Once affixed to the door, aligning an outside edge of the vertical member with the door trim of the interior door frame, and then, securing the anchor means by tightening the anchor nut to the anchor bolt.

DESCRIPTION OF THE PREFERRED EMBODIMENT

Figure 1:
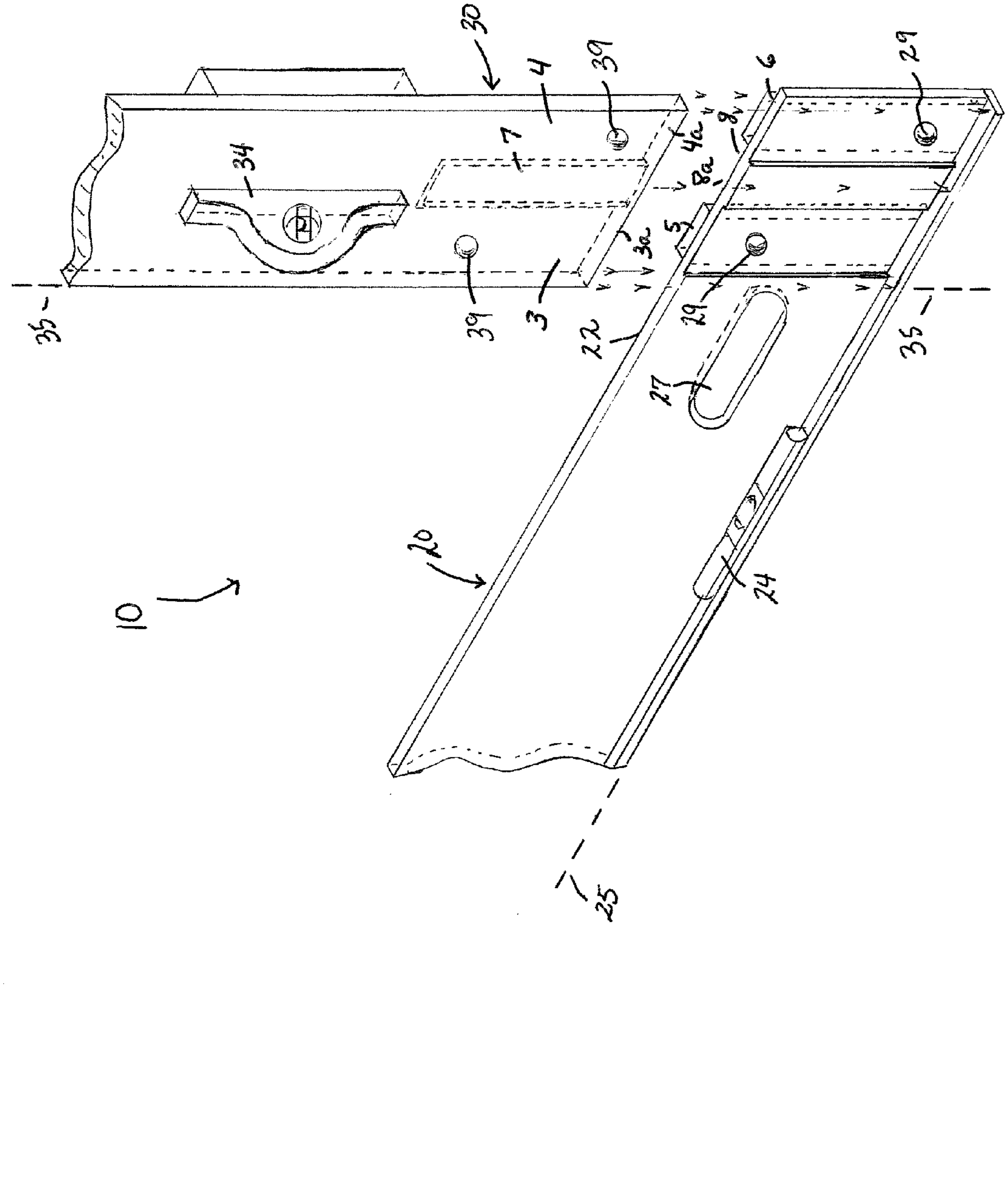
FIG. 1 is an exploded view of the preferred embodiment of the present invention, a door hanging tool.

In accordance with the present invention, a door hanging tool for hanging a pre-hung or existing door to a door jamb is disclosed. Specifically, the described tool relates to an apparatus which allows a single worker to properly position and hang a pre-hung door or an existing door both plumb and level. Once the door hanging tool is installed as will be described, it allows the worker to read both plumb and level hands-free. In the broadest context, the door hanging tool of the present invention consists of components configured with respect to each other so as to attain the desired objective.

The present invention is now exemplified by a particular embodiment which is illustrated in the accompanying drawing.

The door hanging tool of the present invention designated as numeral 10 is generally formed from two substantially similar rigid members releasably joined to define a ninety-degree angle relative to one another. More particularly, the two rigid members are a horizontal member 20 and an upwardly extending vertical member 30. As illustrated, in the preferred embodiment, the horizontal member 20 is releasably attached to the vertical member 30 by aligning apertures 29 in the horizontal member 20 with apertures 39 in the vertical member 30 and inserting bolts 40 therethrough and securing with nuts 42 (not shown).

Figure 4:
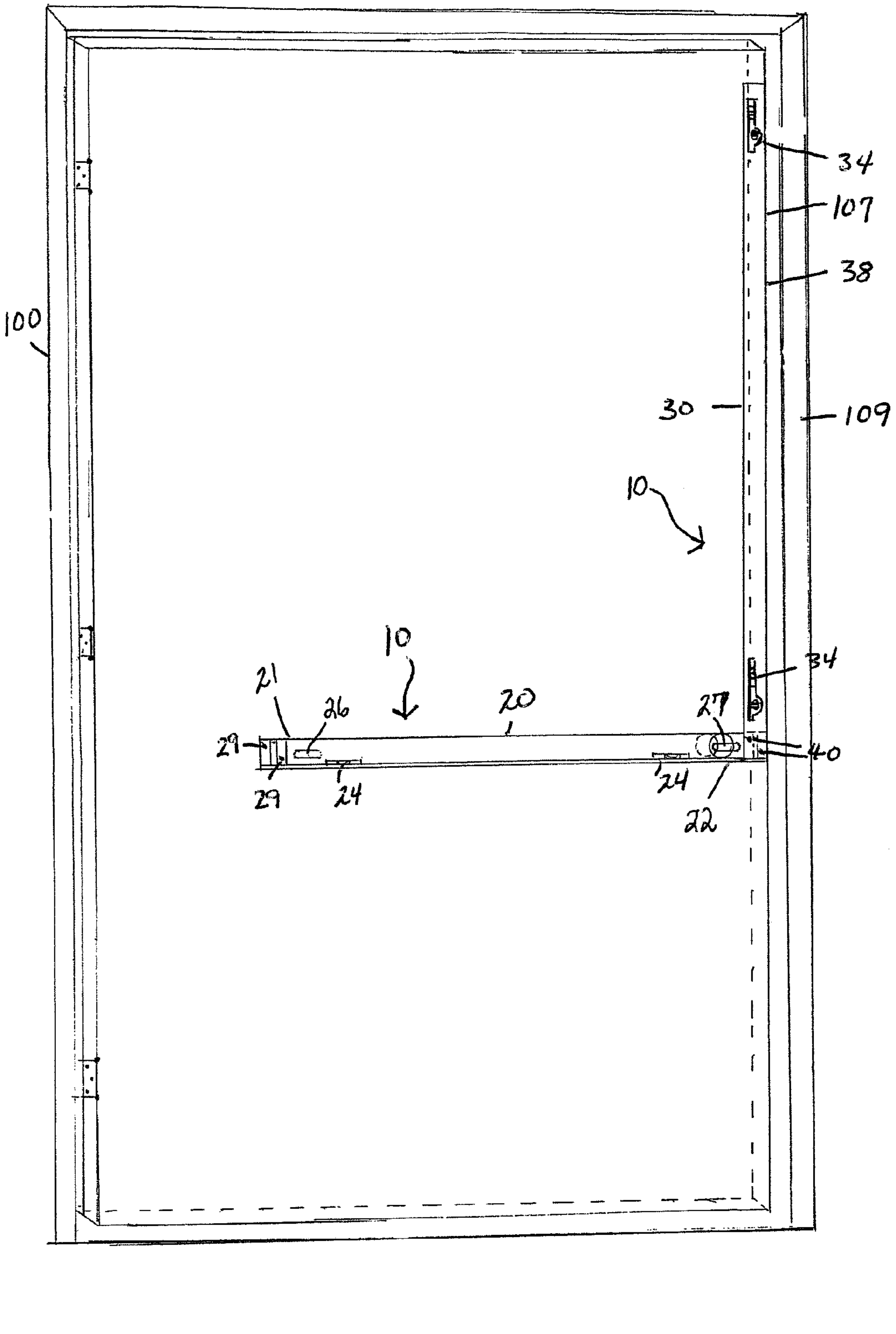
FIG. 4 is a front view of the door hanging tool of FIG. 1 attached to a prior art door.

As illustrated, the horizontal member 20 defines a first end 21 and a second end 22 opposite the first end 21. The horizontal member 20 includes apertures 29 (as best shown in FIG. 4) on both the first end and second end such that the vertical member 30 can be attached to the apertures on the first end 21, of the horizontal member 20, for a right-handed swing door, or the second end 22 as shown, for a left-handed swing door.

Referring to FIG. 1, the vertical member 30 can include first and second sleeves 3,4 with openings 3*a*, 4*a*, respectively, for sliding receipt of first and second columns 5,6 disposed on each end 21, 22 of the horizontal member 20. A third column 7 can be disposed between sleeves 3,4 and is slidingly received in third sleeve 8 through opening 8*a*, which is positioned between the columns 5,6. In application, connecting the members 20, 30 as discussed includes positioning the columns 5,6 into the sleeves 3,4, and the column 7 into the sleeve 8 and sliding therein until the apertures 29, 39 align for receipt of bolts 42 as discussed, such that the inner surface 28 of the horizontal member 20 and the inner surface 38 of the vertical member 20 are on the same plane.

Removing the nuts and bolts 42, 40 and then separating the vertical member 30 from the horizontal member 20 as shown in FIG. 1, places the tool 10 in condition for storage when not in use.

The horizontal member 20 also includes at least one level indicator such as a bubble vial 24 with a longitudinal axis 25 for enabling the determination of the angle of a surface with respect to the member 20. The vertical member 30 also includes at least one level indicator such as a bubble vial 34 with a longitudinal axis 35 perpendicular to a longitudinal axis 25 (shown in FIG. 1) for indicating the inclination of a surface with respect to the member 30.

The horizontal member 20 further defines a first anchor slot 26 disposed at the first end 21 and a second anchor slot 27 disposed at the second end 22. The anchor slots 26, 27 are sized and shaped for selectively receiving an anchor means 50 of the present invention.

Figure 2:
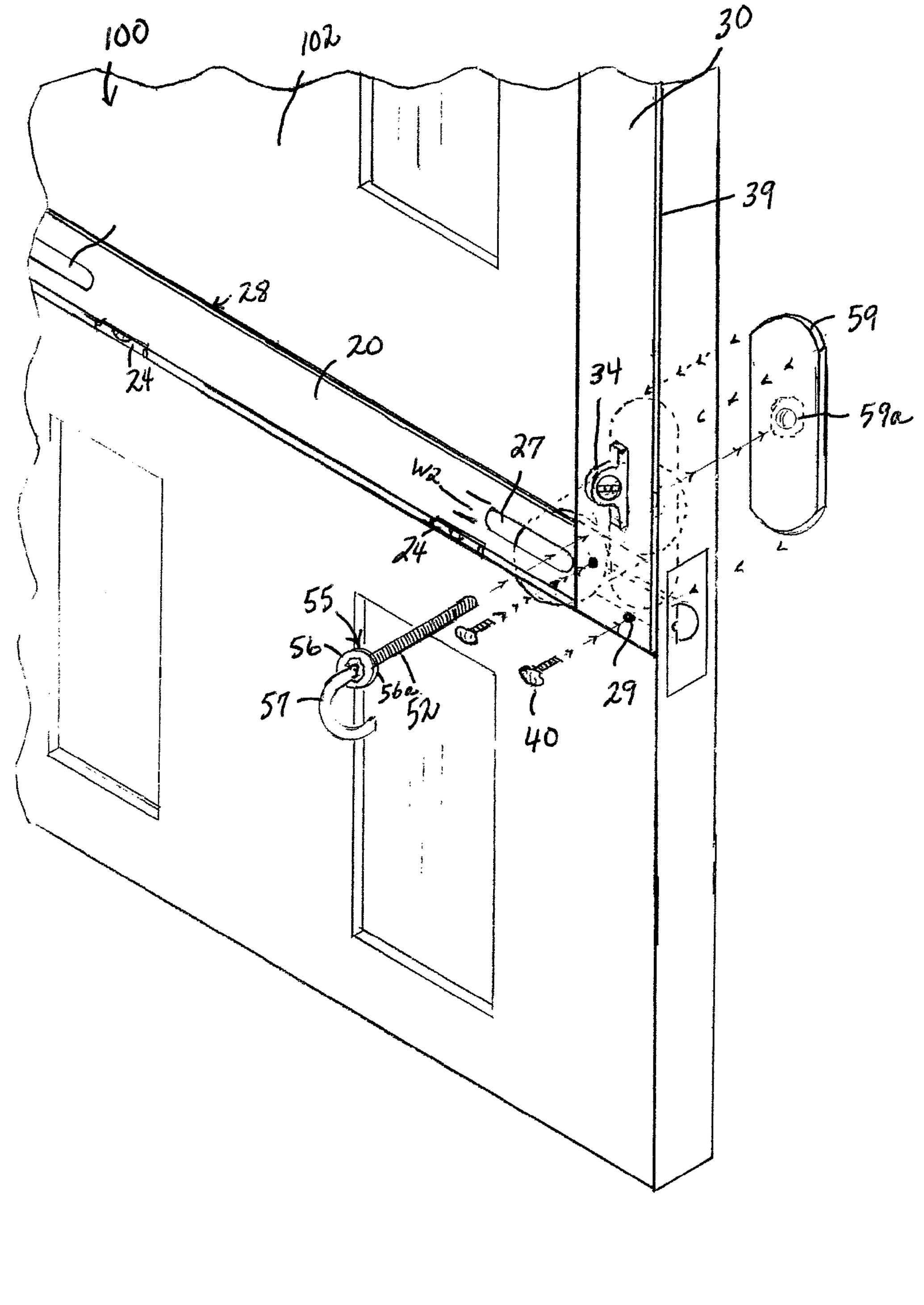
FIG. 2 is a front exploded view of the door hanging tool of FIG. 1 attached to a prior art door.
Figure 3:
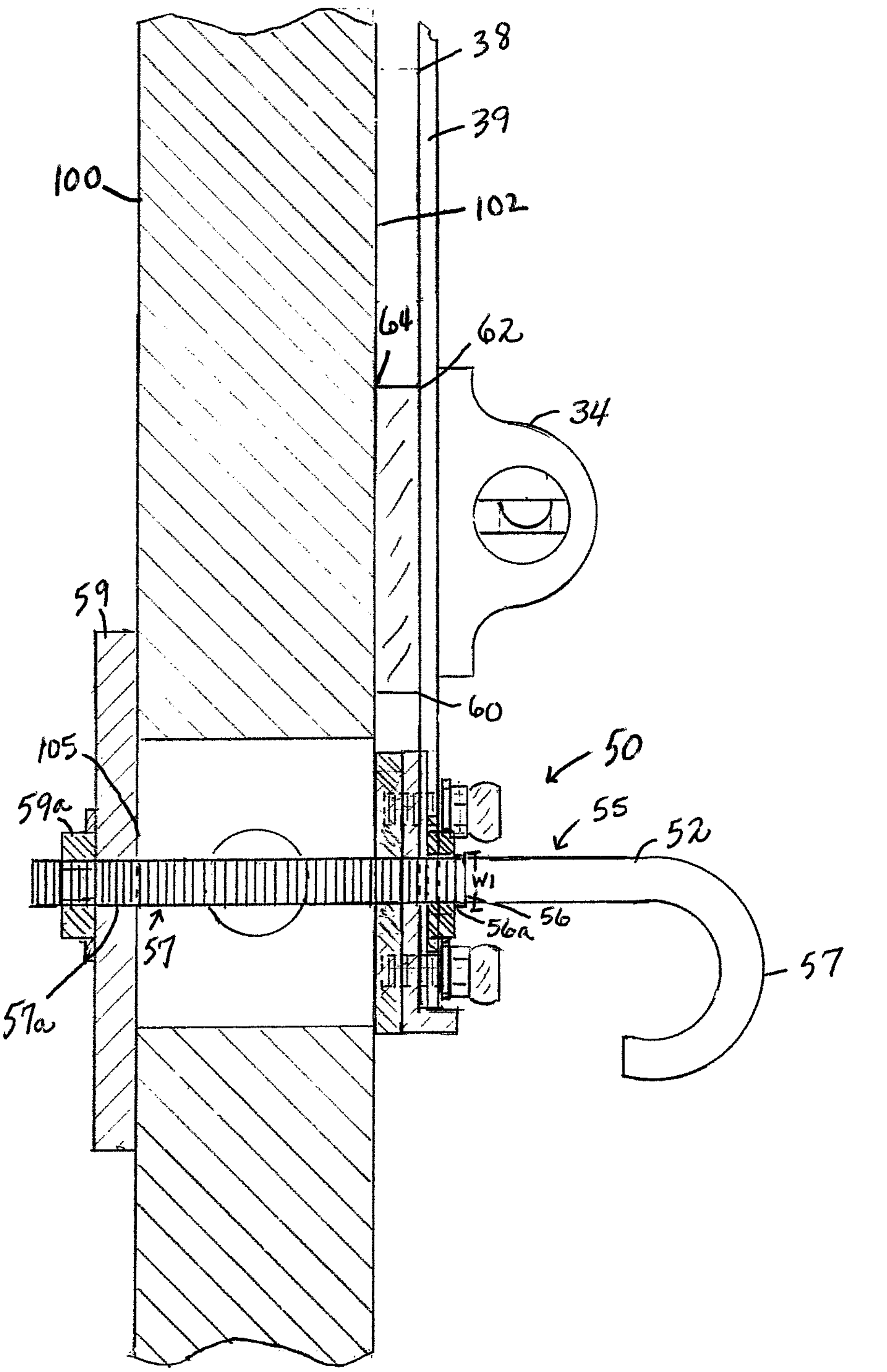
FIG. 3 is a side view of the anchor means of the present invention of FIG. 1.

Referring to FIG. 3, is shown a side view of the anchor means 50 attached to an existing door 100. In particular, and as illustrated, the anchor means 50 includes an anchor bolt 52 that extends through the anchor slot 26 or 27 and through the existing pre-drilled hole for lockset 105 from the door manufacturer. The anchor bolt 52 has a first end 55 that defines a handle 57 and a collar 56, where the collar 56 includes a stop 56*a* that defines a width W1, that is greater than the W2 (see FIG. 2) of the anchor slot so that the anchor bolt 52 having the first end 55 cannot pass completely through the anchor slot. The anchor bolt 52 also has a second end 57 that is sized and shaped to pass through the anchor slot and defines a threaded end 57A that in application is secured in threaded engagement with a plate member 59 and anchor nut 59*a*.

Spacers 60 can be spaced along the length of the members 20, 30. In particular, the spacers 60 include a base portion 62 and a protection portion 64 that is preferably constructed of a rubber material. The base portion 62 can be attached to the inner surface 28 of the horizontal member 20 such that the spacer 60 is positioned between the inner surface 28 and the door surface 102 of the door 100. As should be understood, the spacers 60 disposed between the member 20 and surface 102 as described, in order to protect the surface 102 during application. Referring to FIG. 3, the base portion 62 can be attached to the inner surface 38 of the vertical member 30 such that the spacer 60 is positioned between the inner surface 38 and the door surface 102.

In application, the tool 10 having the horizontal member 20 and vertical member 30 attached to define a ninety-degree angle, is attached to the door by first inserting the anchor bolt 52 through the selected anchor slot in the horizontal member 20 and the pre-drilled hole 105 in the door and loosely attaching with the bolt 52 and plate 59 and nut 59*a*. Once affixed to the door, aligning an outside edge 39 of the vertical member 30 with a door trim stop 107 of the prior interior door frame 109 (see FIG. 4). Once aligned, securing the anchor means 50 by tightening the anchor nut 59*a* to the anchor bolt 52.

With the tool 10 now being attached to the door as described, the user can view the at least one bubble vial 24 on the horizontal member 20 for enabling the determination of the angle of the door with respect to the member 20, and can adjust the door accordingly, and can view the at least one bubble vial 34 of the vertical member 30 for indicating the vertical inclination of the door with respect to the member 30, and can adjust accordingly.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

I claim:

1. A door hanging tool comprising:

a first member that defines an interior side, an exterior side, a first level indicating device, and at least one anchor slot;

an anchor bolt for extending through said anchor slot and through a hanging door's lockset hole, said anchor bolt having a first end that includes a handle with a stop, said stop having a width that is greater than a width of said anchor slot, and a threaded end opposite said first end that threadably secures said anchor bolt to the hanging door with an anchor nut such that said handle extends from the lockset hole for adjusting the hanging door's position with respect to a door frame.

2. The door hanging tool as recited in claim 1, further including a second member that is releasably connected to said first member to define a 90° angle relative to one another, said second member including a second level indicating device.

3. The door hanging tool as recited in claim 2, wherein said first level indicating device defines a first longitudinal axis for enabling the determination of an angle a door spacer with respect to said first member.

4. The door hanging tool as recited in claim 3, wherein said second level indicating device defines a second longitudinal axis perpendicular to said first longitudinal axis for indicating the inclination of a door surface with respect to said second member.

5. The door hanging tool as recited in claim 4, wherein said first level indicating device is disposed on said exterior side of said first member.

6. The door hanging tool as recited in claim 5, wherein said second level indicating device is disposed on an exterior side of said second member.

7. The door hanging tool as recited in claim 1, further including at least one spacer disposed between said interior side of said first member and a hanging door surface.

8. The door hanging tool as recited in claim 7, wherein said at least one spacer includes a protection portion in communication with the hanging door surface.

9. The door hanging tool as recited in claim 8, wherein said protection portion is constructed of a rubber material.

10. The door hanging tool as recited in claim 1, wherein said at least one anchor slot is disposed on an end of said first member.

11. A door hanging tool comprising:

an L-shaped body including first and second legs arranged relative to one another to define a 90° angle;

wherein said first and second legs each define:

an interior side, an exterior side, a first level indicating device assembled to the first leg, a second level indicating device assembled to the second leg; and wherein said first leg includes at least one anchor slot;

an anchor bolt for extending through said anchor slot and for extending through a hanging door's lockset hole, said anchor bolt having a first end that includes a stop that has a width that is greater than a width of said anchor slot, and a threaded end opposite said first end that threadably secures said anchor bolt to the hanging door with an anchor nut.

12. The door hanging tool as recited in claim 11, wherein said first level indicating device defines a first longitudinal axis for enabling the determination of an angle of a door surface with respect to said first leg.

13. The door hanging tool as recited in claim 12, wherein said second level indicating device defines a second longitudinal axis perpendicular to said first longitudinal axis for indicating the inclination of the door surface with respect to said second leg.

14. The door hanging tool as recited in claim 11, further including at least one spacer disposed between said interior side of said first leg and a hanging door surface.

15. The door hanging tool as recited in claim 14, wherein said at least one spacer includes a protection portion in communication with the hanging door surface.

16. The door hanging tool as recited in claim 15, wherein said protection portion is constructed of a rubber material.

17. The door hanging tool as recited in claim 11, wherein said first and second legs are releasably connected.

18. The door hanging tool as recited in claim 11, wherein said at least one anchor slot is disposed on an end of said first leg.

19. The door hanging tool as recited in claim 11, wherein said first level indicating device is disposed on said exterior side of said first leg.

20. The door hanging tool as recited in claim 11, wherein said second level indicating device is disposed on said exterior side of said second leg.

* * * * *